(12) United States Patent
Zhao et al.

(10) Patent No.: US 12,093,715 B2
(45) Date of Patent: Sep. 17, 2024

(54) HYBRID LEASE FOR PRIMARY ELECTION

(71) Applicant: Google LLC, Mountain View, CA (US)

(72) Inventors: Zhenyu Zhao, Sammamish, WA (US); Zachary Fewtrell, Redmond, WA (US); Srishti Srivastava, Bothell, WA (US); Prajakta Joshi, Redmond, WA (US); Nikhil Kothari, Kirkland, WA (US); Nayer Naguib, County Dublin (IE); Lawrence E. Greenfield, New York, NY (US); Huseyin Simitci, Bellevue, WA (US); Gopal Ashok, San Francisco, CA (US); Cristopher Whitton Shumate, Redmond, WA (US)

(73) Assignee: Google LLC, Mountain View, CA (US)

( * ) Notice: Subject to any disclaimer, the term of this patent is extended or adjusted under 35 U.S.C. 154(b) by 467 days.

(21) Appl. No.: 17/462,477

(22) Filed: Aug. 31, 2021

(65) Prior Publication Data

US 2022/0066811 A1 Mar. 3, 2022

Related U.S. Application Data

(60) Provisional application No. 63/073,513, filed on Sep. 2, 2020.

(51) Int. Cl.
*G06F 9/455* (2018.01)
(52) U.S. Cl.
CPC .......... *G06F 9/45558* (2013.01); *G06F 2009/45575* (2013.01); *G06F 2009/45583* (2013.01); *G06F 2009/45595* (2013.01)
(58) Field of Classification Search
CPC .................................................. G06F 9/45558
See application file for complete search history.

(56) References Cited

U.S. PATENT DOCUMENTS 9,489,434 B1 11/2016 Rath
10,585,746 B2 * 3/2020 Shilane ................. G06F 16/273
(Continued)

FOREIGN PATENT DOCUMENTS

CN 109240840 A 1/2019
WO 2011053595 A1 5/2011

OTHER PUBLICATIONS

International Search Report and Written Opinion for International Application No. PCT/US2021/048366 dated Dec. 9, 2021. 13 pages.

(Continued)

*Primary Examiner* — Charlie Sun
(74) *Attorney, Agent, or Firm* — Lerner David LLP (57) ABSTRACT

A system including a data plane including a first virtual machine designated as a primary node and a second virtual machine designated as a secondary node, and a lock service configured to control changes in designation of the primary node and the secondary node. The first virtual machine repeatedly issues requests to the second virtual machine or lock service extending designation as the primary node for a first duration. The request is repeatedly issued within a duration shorter than the first duration. The second virtual machine receives an indication of the designation of the first virtual machine as the primary node being extended, issues a request to the lock service to change the designation of the primary node after passage the first duration of time without further indication of first virtual machine being extended as primary node, and receives confirmation from the lock service of the change in designation.

22 Claims, 7 Drawing Sheets

(56) References Cited

U.S. PATENT DOCUMENTS

| | | |
|---|---|---|
| 2011/0099420 A1 | 4/2011 | MacDonald McAlister et al. |
| 2018/0095846 A1 | 4/2018 | Sanakkayala et al. |
| 2020/0250046 A1 | 8/2020 | Wong et al. |

OTHER PUBLICATIONS

First Examination Report for Indian Patent Application No. 202247065414 dated Sep. 26, 2023. 7 pages.

* cited by examiner

HYBRID LEASE FOR PRIMARY ELECTION

CROSS-REFERENCE TO RELATED APPLICATION

The present application claims the benefit of the filing date of U.S. Provisional Application No. 63/073,513, filed Sep. 2, 2020, the disclosure of which is hereby incorporated herein by reference.

BACKGROUND

Databases may run parallel instances of a dataset or data collection in order to increase processing efficiency. One of the instances may be designated as a primary node storing a primary copy of the dataset. Another instance may be designated as a secondary or replica node storing a secondary or replica copy of the dataset. When the instance of the primary node experiences a failure, operations may move from reading the data from the primary node instance to reading the data from the secondary node instance instead, in order to avoid extended downtime. This process is typically referred to as "failover."

Parallel instances storing the primary and secondary copies of the dataset may be associated with respective virtual machines of the database. Control of the virtual machines, including control of failover operations, may be operated by one or more servers assigned with performing administrative tasks. The virtual machines may operate within a data plane of the database, and the one or more servers within a control plane for controlling the data plane. For example, the one or more servers may designate primary and secondary statuses to the respective instances. This may include demoting an instance from its status as a primary copy, such as failure of the instance.

In the case of failure of an instance storing a primary copy of the dataset, it may be necessary for the one or more servers to recreate a managed instance group (MIG) before demoting the previous primary node and promoting the new secondary node. This process can take a few minutes or even longer.

BRIEF SUMMARY

The technology of the present disclosure relates generally to managing primary and replica read copies of database instances.

One aspect of the present disclosure is directed to a system including a data plane comprising a plurality of virtual machines including a first virtual machine designated as a primary node and a second virtual machine designated as a secondary node, and a lock service configured to control changes in designation of the primary node and the secondary node, wherein the first virtual machine is configured to repeatedly issue a request to at least one of the second virtual machine or the lock service extending designation of the first virtual machine as the primary node for a first duration of time, wherein the request is repeatedly issued within a second duration of time shorter than the first duration of time, and wherein the second virtual machine is configured to: receive from the first virtual machine or the lock service an indication of the designation of the first virtual machine as the primary node being extended for the first duration of time; after passage the first duration of time without a further indication of the designation of the first virtual machine as the primary node being extended, issue a request to the lock service to change the designation of the primary node from the first virtual machine to the second virtual machine; and receive confirmation from the lock service of the change in designation of the primary node from the first virtual machine to the second virtual machine.

In some examples, the first virtual machine may be configured to repeatedly issue the request until occurrence of a failure at the first virtual machine, a determination at the first virtual machine to self-demote from the designation as the primary node, or receiving, from one or more servers of a control plane communicatively coupled to the data plane, an instruction to demote itself from the designation as the primary node.

In some examples, each of the first virtual machine and the second virtual machine may be assigned a unique identification, and the lock service may be configured to track designation of the primary node and the secondary node based on the respective unique identifications of the first virtual machine and the second virtual machine. In some examples, the unique identification of the first virtual machine may be reset each time a process of the first virtual machine is restarted, and the unique identification of the second virtual machine may be reset each time a process of the second virtual machine is restarted. In some examples, the respective unique identifications of the first virtual machine and the second virtual machine may be stored in memory, such that the respective unique identifications do not change each time a respective process of the first virtual machine or the second virtual machine is restarted.

In some examples, the first virtual machine may be further configured to receive from the lock service, in response to the request extending designation of the first virtual machine as the primary node, confirmation of the designation of the first virtual machine as the primary node.

In some examples, the lock service may be configured to: store in memory a stored precondition; receive a conditional request from a requesting virtual machine to maintain or change the designation of the primary node, wherein the conditional request includes a precondition from the requesting virtual machine; compare the precondition from the requesting virtual machine to the stored precondition; responsive to the precondition from the requesting virtual machine matching the stored precondition, authorize the conditional request; and responsive to the precondition from the requesting virtual machine not matching the stored precondition, deny the conditional request.

In some examples, the lock service may be further configured to: transmit to each of the first virtual machine and the second virtual machine, in response to the request extending designation of the first virtual machine as the primary node, a first precondition for maintaining or changing the designation of the primary node; and store the first precondition in the memory.

In some examples, the lock service may be further configured to: receive a first conditional request from one of the first virtual machine or the second virtual machine, the first conditional request including the first precondition; authorize the first conditional request; and transmit, to each of the first virtual machine and the second virtual machine, an indication of the authorized first conditional request and a second precondition; and replace the stored first precondition with the second precondition in the memory, wherein the first conditional request being received from the first virtual machine results in extending designation of the first virtual machine as the primary node for the first duration of time, and wherein the first conditional request being received from the second virtual machine results in changing designation of the primary node from the first virtual machine to the second virtual machine.

In some examples, the system may further include a control plane comprising one or more processors for managing operation of the plurality of virtual machines in the data plane. The one or more processors of the control plane may be configured to: monitor health of each of the first virtual machine, the second virtual machine and the lock service; in response to an indication of failure of one of the first virtual machine or the second virtual machine, execute one or more programs to recover the failed virtual machine; after recovery of the failed virtual machine, transmit an indication to the recovered virtual machine designating the other virtual machine as the primary node; and after transmission of the indication to the recovered virtual machine, transmitting an instruction to the other virtual machine designating it as the primary node.

In some examples, the one or more processors of the control plane may be configured to, in response to determining that the lock service and the primary node are inoperable: transmit instructions to the secondary node designating it as the primary node; recover, repair, restart or replace the primary node; and transmit instructions to the recovered, repaired, restarted or replaced primary node designating it as the secondary node.

In some examples, the one or more processors of the control plane may be configured to, in response to determining that the lock service and both the primary and secondary nodes are inoperable: recover, repair, restart or replace each of the primary node and the secondary node; select one of the nodes to be the primary node; transmit instructions to the selected recovered, repaired, restarted or replaced node designating it as the primary node; and transmit instructions to the not-selected recovered, repaired, restarted or replaced node designating it as the secondary node.

In some examples, the one or more processors of the control plane may be configured to, in response to determining that both the primary and secondary nodes are inoperable and that the lock service is operable, recover, repair, restart or replace each of the primary node and the secondary node. Each of the recovered, repaired, restarted or replaced nodes may be configured to transmit to the lock service a request for designation as the primary node, and the lock service may be configured to grant the request for designation to a first requesting node.

Another aspect of the disclosure is directed to a method of controlling designation of a primary node and a secondary node among a plurality of virtual machines in a data plane of a data center. The method may include: receiving, at one or more processors, an indication of designation of a first virtual machine as the primary node, wherein the one or more processors are assigned to a second virtual machine; transmitting, from the one or more processors to the first virtual machine, an acknowledgement of the indication of designation; receiving, at the one or more processors, an indication of extension of the designation of the first virtual machine as the primary node, wherein the indication of extension is received a predetermined first amount of time after the indication of designation is received; determining passage of a predetermined second amount of time after the indication of extension is received without receiving a further indication of extension, wherein the second amount of time is greater than the first amount of time; in response to the determination, transmitting, from the one or more processors to a lock service, a request for designation as the primary node; and receiving, from the lock service at the one or more processors, confirmation that the second virtual machine is designated as the primary node.

In some examples, the second virtual machine may be initially designated as the secondary node, and the request for designation as the primary node may be a request to change the designation of the second virtual machine from the secondary node to the primary node.

In some examples, each virtual machine may be associated with a unique identification separate from an IP address of the virtual machine, and transmitting the request for designation as the primary node may include transmitting the unique identification of the second virtual machine to the lock service.

In some examples, the method may further include: receiving the indication of designation of the first virtual machine as the primary node with a first precondition for changing the designation of the primary node from the first virtual machine to the second virtual machine; and storing the first precondition in memory.

In some examples, the method may further include: receiving, by the one or more processors, the indication of extension with a second precondition, wherein the second precondition is different from the first precondition; replacing, by the one or more processors, the stored first precondition with the second precondition in the memory; and transmitting, by the one or more processors to the lock service, the request for designation as the primary node with the second precondition.

Yet another aspect of the disclosure is directed to a method of controlling designation of a primary node and a secondary node among a plurality of virtual machines in a data plane of a data center. The method may include: receiving, at one or more processors included in the data plane of the data center and configured to execute a lock service routine, a designation request from a first virtual machine to be designated as the primary node; transmitting, from the one or more processors to the first virtual machine, confirmation that the first virtual machine is designated as the primary node for a grace period having a predetermined length and beginning from receipt of the designation request; receiving, at the one or more processors, an extension request from the first virtual machine to renew the designation of the first virtual machine as the primary node, wherein a time between the designation request and the extension request is a lease period shorter than the grace period; transmitting, from the one or more processors to the first virtual machine, confirmation that the first virtual machine is maintained as the primary node; resetting, by the one or more processors, the grace period to begin from receipt of the extension request; receiving, at the one or more processors from a second virtual machine, a first change request to change designation of the primary node to the second virtual machine, wherein the first change request is received during the grace period; transmitting, from the one or more processors to the second virtual machine, denial of the first change request; receiving, at the one or more processors from the second virtual machine, a second change request to change designation of the primary node to the second virtual machine, wherein the second change request is received after expiration of the grace period; and transmitting, from the one or more processors to the second virtual machine, acceptance of the second change request.

In some examples, the method may further include: receiving, at the one or more processors, a unique identification of the first virtual machine with the designation request, wherein the unique identification is separate from an IP address of the first virtual machine. storing, the one or more processors, the unique identification of the first virtual machine in memory; receiving, at the one or more processors, the unique identification of the first virtual machine with the extension request; determining that the extension request is received from the first virtual machine based on the unique identification; and transmitting, from the one or more processors to the first virtual machine, the confirmation in response to the determination that the extension request is received from the first virtual machine.

In some examples, the method may further include: transmitting, by the one or more processors, a first precondition to the first virtual machine with the confirmation that the first virtual machine is designated as the primary node; storing, by the one or more processors, the first precondition in memory; receiving, at the one or more processors, the first precondition from the first virtual machine with the extension request; determining that the extension request is valid based on the first precondition received with the extension request matching the first precondition stored in memory; transmitting, by the one or more processors, a second precondition to the first virtual machine with the confirmation that the first virtual machine is maintained as the primary node; and replacing, by the one or more processors, the stored first precondition with the second precondition in the memory.

In some examples, transmitting the first precondition to the first virtual machine may further include transmitting the first precondition to the second virtual machine, transmitting the second precondition to the first virtual machine may further include transmitting the second precondition to the second virtual machine, receiving the first change request from the second virtual machine may further include receiving the second precondition from the second virtual machine, and receiving the second change request from the second virtual machine may further include receiving the second precondition from the second virtual machine. The method may further include determining, by the one or more processors, to grant the second change request based on each of (i) the expiration of the grace period and (ii) the second precondition received with the second change request matching the second precondition stored in memory.

DETAILED DESCRIPTION

Overview

The present disclosure is directed to a method of controlling failover from within the data plane and without having to communicate with the control plane. Excluding the control plane from the failover process can shorten the duration of the failover process, thus resulting in less downtime for the database.

In order to manage the failover from the data plane, one or more processors in the data plane may be programmed with a lock service routine that controls control changes in designation of the primary node and the secondary node within the database. The lock service may receive repeatedly requests repeatedly issued from the primary node to commence and extend the designation as the primary node for a given duration of time, and may deny requests from the other nodes to be designated as the primary node for the given duration of time. The repeatedly issued requests may be received with a duration of time that is shorter than the given duration of time, such that the currently-designated primary node does not risk another node being granted the designation as primary node in the interim between expiration of one request and issuance of the next request.

The primary node may be configured to communicate with the secondary node to indicate its designation as primary node. The secondary node may further communicate to the primary node a confirmation of the designation. For instance, the confirmation may include a promise to not issue a request to the lock service to be designated the primary node for the given duration. The granted designation from the lock service and promise from the secondary node effectively function as a dual lease, or hybrid lease, of the designation as primary node. After passage of the given duration, if the secondary node has not received a further communication from the primary node and not made a renewed promise, such as in the event of failure at the primary node, the secondary node may issue a request to the lock service to be designated the primary node. Assuming that the primary node has failed and has not requested to extend its designation as primary node, the request from the secondary node may be granted by the lock service, thus completing the failover operation.

In some examples, the lock service may track identities of the primary and secondary nodes using unique identifications assigned to each respective node. The unique identifications may be separate from the IP addresses of the nodes, since relying on IP addresses may result in a conflict, such as when two virtual machines have the same IP address.

In some examples, requests for designation as primary node may include a precondition, which may be compared to a stored precondition at the lock service. If the preconditions match and the given duration of time has passed, then the request may be granted. Granting a request may result in the stored precondition at the lock service being updated, and the updated precondition being sent to the then-current primary and secondary nodes. Subsequent requests from another node including the outdated precondition may then be denied.

For example, if a primary node experiences failure and is demoted, two other nodes may be designated the primary and secondary nodes. Later, when the primary node is repaired, it may not have been informed of the change in designation and may issue a request to extend its designation as the primary node along with the outdated precondition. However, the outdated precondition will have already been replaced in the memory of the lock service, so the request will be denied and the newly-designated primary node will remain the primary node. As seen from this example, the use of preconditions may prevent a conflict whereby two nodes are separately granted designation as the primary node.

In some examples, the primary node may retain its designation and data may continue to be read from the primary node even if the lock service fails. For instance, the primary node may communicate directly with the secondary node to repeatedly communicate designation as primary node. The primary node may further receive from the secondary node repeated promises to not issue a request to be designated the primary node. As such, the data plane is configured to avoid changes in designation of the primary and secondary nodes in the possible event of a failure at the lock service.

The above examples may reduce an overall unavailability time of the database due to failover events. Based on an analysis of current database systems, the overall downtime is estimated to be reduced by approximately 57% for an arrangement in which failover events are resolved after an average of 2 minutes, and the overall downtime is estimated to be reduced by approximately 69% for an arrangement in which failover events are resolved after an average of 1 minute. Thus, the systems and routines of the present disclosure can provide for reduced downtime and, in turn, increased efficiency.

Example Systems

Figure 1:
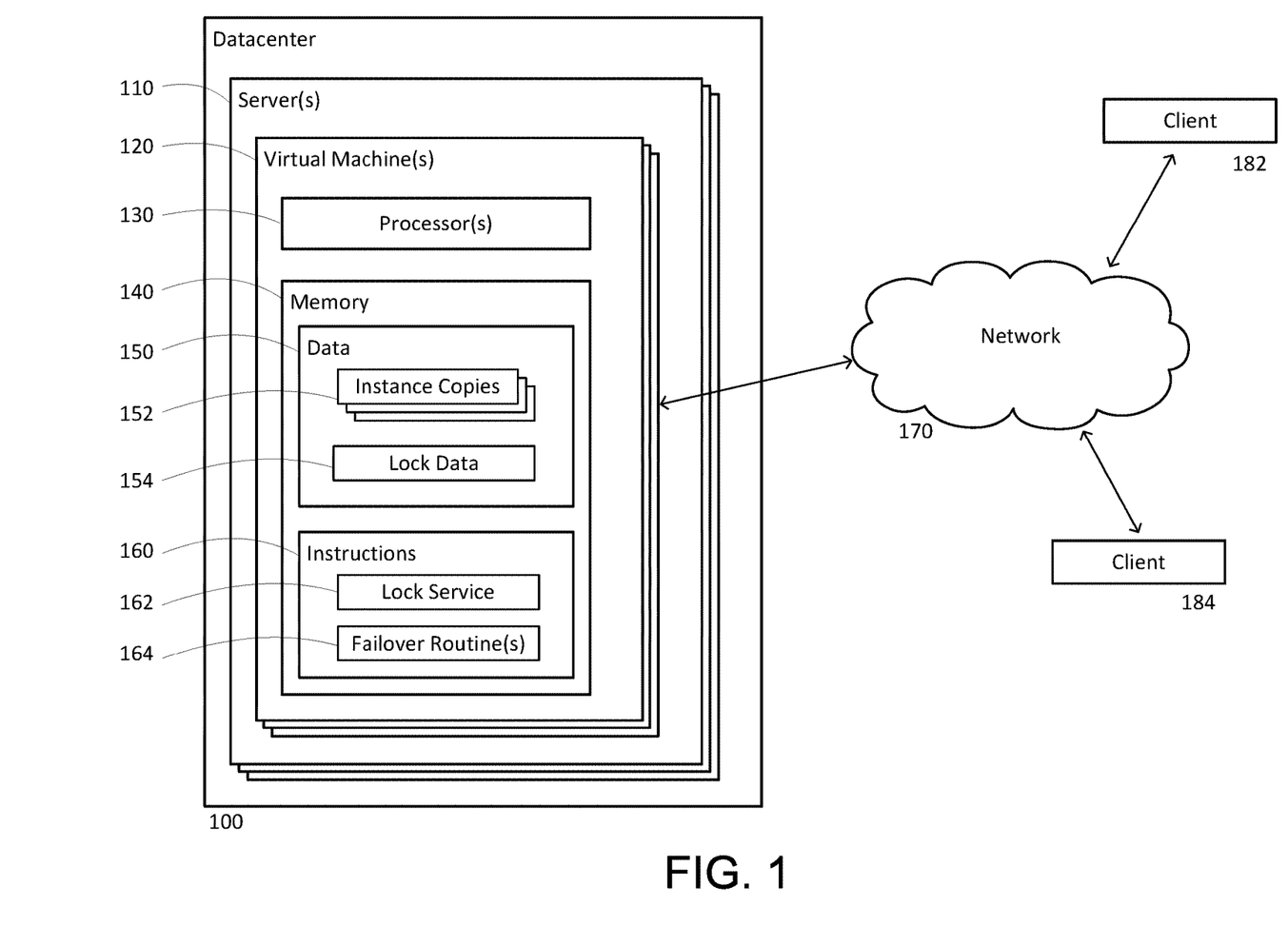
FIG. 1 is a block diagram illustrating an example system in accordance with an aspect of the present disclosure.

FIG. 1 is a block diagram illustrating an example system including a datacenter 100. The datacenter may include one or more servers 110. The servers 110 may communicate with a plurality of client devices, such as client computing systems or clients 182, 184 over one or more network connections shown as network 170 in FIG. 1, which may connect the servers and clients through the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and RPC, HTTP, and various combinations of the foregoing. The servers 110 may also communicate with each other, for example, through local wired or wireless connections, over the network, or any combination thereof.

Each of clients 182, 184 may include a processor and memory. The memory may include any one or combination of data and instructions. Data included in the memory may be analyzed or otherwise processed by the processor based on the instructions. The clients 182, 184 may communicate data and instructions with the one or more servers 110 of the datacenter over the network 170 by transmitting or receiving operations. For example, a client 182, 184 may transmit an instruction to the servers 110 to access, store or process data at the datacenter 100. While only a few clients are shown, it should be understood that a vast number of client devices may communicate with the datacenter 100 over the network 170. While only a few servers are shown in FIG. 1, it should be understood that any number of servers may be included in the datacenter 100. Furthermore, in some instances, each server may be associated with one or more smaller databases included in the datacenter.

The datacenter 100 may include a number of virtualized environments, or virtual machines 120. Processors 130 and memory 140 of the servers 110 may be allocated to addresses of the virtual machines 120 of the datacenter 100. The processors 130 may be utilized as computing resources for workloads and other instructions received from the clients 182, 184, such as tasks to access, store, or otherwise operate on data at the memory 140. Workloads may be divided among the virtual machines 120. Each virtual machine 120 may be associated with or assigned an amount of processing power of the processors 130, such as a number of assigned processors, as well as an amount of random access memory from the memory 140, for completing various client tasks or workloads.

The processors 130 can be a well-known processor or other lesser-known types of processors. Alternatively, the processors 130 can be dedicated controllers such as an ASIC.

The memory 140 may include a type of non-transitory computer readable medium capable of storing information accessible by the processors 130, such as a hard-drive, solid state drive, tape drive, optical storage, memory card, ROM, RAM, DVD, CD-ROM, write-capable, and read-only memories. The datacenter 100 may implement any of a number of architectures and technologies, including, but not limited to, direct attached storage (DAS), network attached storage (NAS), storage area networks (SANs), fiber channel (FC), fiber channel over Ethernet (FCoE), mixed architecture networks, or the like. The datacenter may include a number of other devices in addition to the storage devices, such as cabling, routers, etc.

The memory 140 can store information accessible by the one or more processors 130, including data 150 that is received at or generated by the processors 130, and instructions 160 that can be executed by the one or more processors 130. The data 150 can be retrieved, stored or modified by the processors 130 in accordance with the instructions 160. For instance, although the system and method is not limited by a particular data structure, the data 150 can be stored in computer registers, in a data store as a structure having a plurality of different fields and records, or documents, or buffers. The data 150 can also be formatted in a computer-readable format such as, but not limited to, binary values, ASCII or Unicode. Moreover, the data 150 can include information sufficient to identify relevant information, such as numbers, descriptive text, proprietary codes, pointers, references to data stored in other memories, including other network locations, or information that is used by a function to calculate relevant data. The instructions 160 can be a set of instructions executed directly, such as machine code, or indirectly, such as scripts, by the processor 130. In this regard, the terms "instructions," "steps" and "programs" can be used interchangeably herein. The instructions 160 can be stored in object code format for direct processing by the processor 130, or other types of computer language including scripts or collections of independent source code modules that are interpreted on demand or compiled in advance.

The data 150 may include copies 152 of one or more datasets. For a given dataset. Copies of the dataset may be stored at memory of multiple virtual machines 120. Each virtual machine 120 may represent a node within the datacenter 100, such that each node may store a respective copy of the dataset run at a separate instance of the datacenter 100. For example, a primary copy of the dataset may be stored at memory assigned to a first node of the virtual machines, and a secondary or backup copy of the dataset may be stored at memory assigned to a second node of the virtual machines. In order to maintain consistency of the dataset, the virtual machines may be configured to allow client to access and process only data in the primary copy, and to use the primary copy in order to update the secondary copy.

An advantage of having the secondary copy may be to move access and operations from the primary copy to the secondary copy in case of failure at the primary node. However, until such failure occurs, operations may remain directed to the primary node and the secondary node may be prevented from receiving or responding to commands from a client. In order to lock the secondary node, the data 150 may include lock data 154. The lock data 154 may indicate an identity of a primary node, such that only commands directed to the primary node are valid. Additionally or alternatively, the lock data 154 may indicate an identity of the secondary node, such that commands directed to the secondary node are determined to be invalid. In some examples, identities of the primary and secondary nodes may include respective virtual addresses of the nodes. In some examples, identities of the primary and secondary nodes may include unique identifiers associated with each virtual machine, such as a run_id which is regenerated every time a virtual machine is restarted. Use of run_id in place of virtual addresses can ensure that two virtual machines are not being identified by the same identifier at any given time.

Lock data 154 may also include information used to determine whether requests from the respective nodes to be granted status as a primary node are valid or invalid. For example, lock data 154 may include an indication of a most recent time that one node requested or renewed designation as primary node, whereby requests from other nodes to be granted status as primary node may be denied for a predetermined duration afterwards. For further example, lock data 154 may include a predicate. The predicate may function as a token, whereby future requests for designation or extension as primary node must include the predicate in order to be valid. Example implementations of lock data are provided in the example routines herein.

The instructions 160 may include various algorithms for instructing the processor 130 to execute operations in accordance with the routines described herein. For example, the instructions 160 may include a lock service routine 162 for managing designation of primary and secondary nodes, including locking or preventing a secondary node from being designated a primary node absent failure of the primary node to retain its designation as the primary node. For further example, the instructions 160 may include a failover routine 164 for moving primary node designation over from the previously designated primary node to the previously designated secondary node. The failover routine may be designed to avoid split brain errors that result in multiple designations of a primary node at one time, while also avoid long outages without designation of a working primary node. These routines and others are described in greater detail in connection with the flow diagrams of FIGS. 3-7. It should be understood that the routines described herein are merely examples, and in other examples, certain steps may be added, subtracted, replaced or reordered.

Although FIG. 1 functionally illustrates each of the processor 130 and memory 140 as being a single block, the processor 130 and memory 140 may actually include multiple processors and memories that may or may not be stored within the same physical housing. For example, some of the data 150 and instructions 160 stored in the memory can be stored on a removable CD-ROM and others within a read-only computer chip. Some or all of the instructions and data can be stored in a location physically remote from, yet still accessible by, the processors 130.

Additionally, although FIG. 1 functionally illustrates the datacenter 100 as being a single block, the datacenter 100 may actually include multiple datacenters forming a distributed database. The multiple datacenters may be capable of communication over wired/wireless connections and over the network 170.

Figure 2:
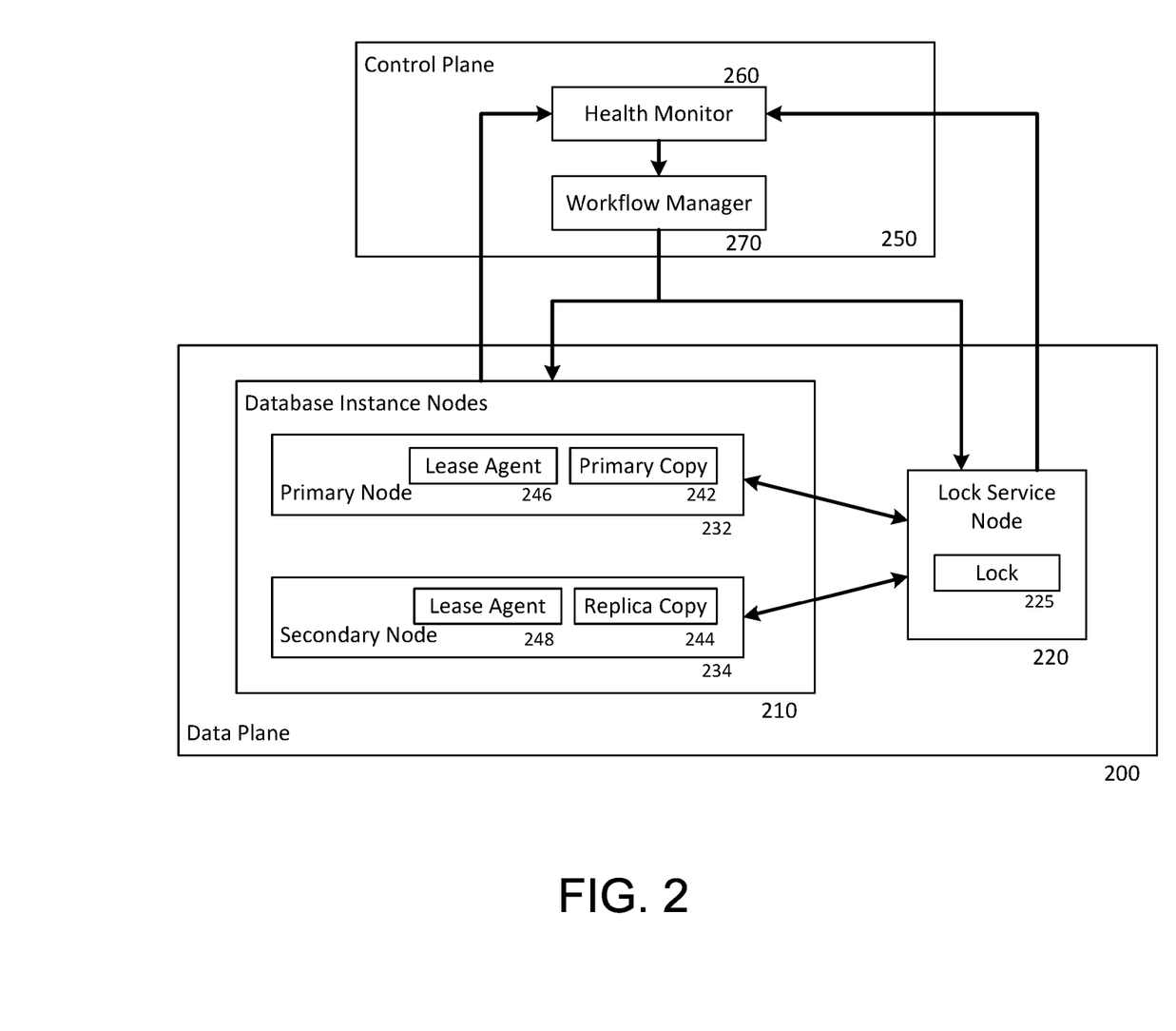
FIG. 2 is a functional block diagram illustrating an example database of the example system of FIG. 1.

FIG. 2 is a functional block diagram illustrating an example implementation of the example database of the system of FIG. 1. In the example of FIG. 2, the database is shown as including a data plane 200 having multiple nodes including database instance nodes 210 and a lock service node 200. The database instance nodes 210 may store multiple copies of a dataset across multiple instances, shown as instance copies 152 in FIG. 1, for example at respective virtual machines. A first virtual machine having a primary copy 242 of the dataset may be designated a primary node 232. A second virtual machine having a secondary copy 244 of the dataset may be designated a secondary node 234. The respective dataset copies may be stored at respective memory assigned to each of the first and second virtual machines. Each of the nodes may further include a lease agent 246, 248 configured to control requests for designation as a primary node. In a primary node, the lease agent may track an amount of time that the primary node has remaining with its designation. Similarly, in a secondary node, the lease agent may track an amount of time that the secondary node has remaining with its designation. Each lease agent may also track time remaining until a node automatically demotes itself from its current status, which may be either primary or secondary node. The lock service node 220 may be maintained as separate node from the database instance nodes, and may be operated by a separate virtual machine from the primary and secondary virtual machines, within the data plane 200. The lock service node 220 may be tasked with performing at least some aspects of the lock service routine 162 and failover routine 164 of FIG. 1, although some aspects of those routines may be tasked to the database instance nodes 210 in case of failure at the lock service node 220. Furthermore, memory assigned to the lock service node 220 may be tasked with storing and managing the lock data 154 of FIG. 1.

In the example of FIG. 2, each of the primary and secondary nodes 232, 234 may be capable of communicating with the lock service node 220. Communication may include requests for designation or extension as a primary node, indications of acceptance or denial of a request, identification information for the respective instance nodes 210, and in some examples additional information such as a predicate to validate the designation/extension requests. Examples of lock data management are described in greater detail in connection with the example routines herein.

The database of FIG. 2 is also shown as including a control plane 250 having one or more processors designated to monitor and control operations at the data plane 200. The control plane 250 may include a health monitor 260 configured to receive data from each nodes in the data plane, and determine based on the data received—or absence of data received—a health of the node, such as whether the node is operational, non-operational, or operating poorly. The control plane 250 may further include a workflow manager 270 configured to manage the nodes of the data plane 200, such as repairing or replacing a node that is not operating properly, including database instance nodes 232, 234 and the lock service node 220. In conventional systems, the control plane processors are typically tasked with controlling designation and re-designation of primary and secondary nodes, including controlling failover operations between working and non-working nodes. In the present disclosure, the lock service node 220 I primarily tasked with such responsibilities, although the workflow manger 270 may also be configured to perform similar tasks, such as in the event that the lock service is determined to be non-operational or operating poorly.

Example Methods

Figure 3:
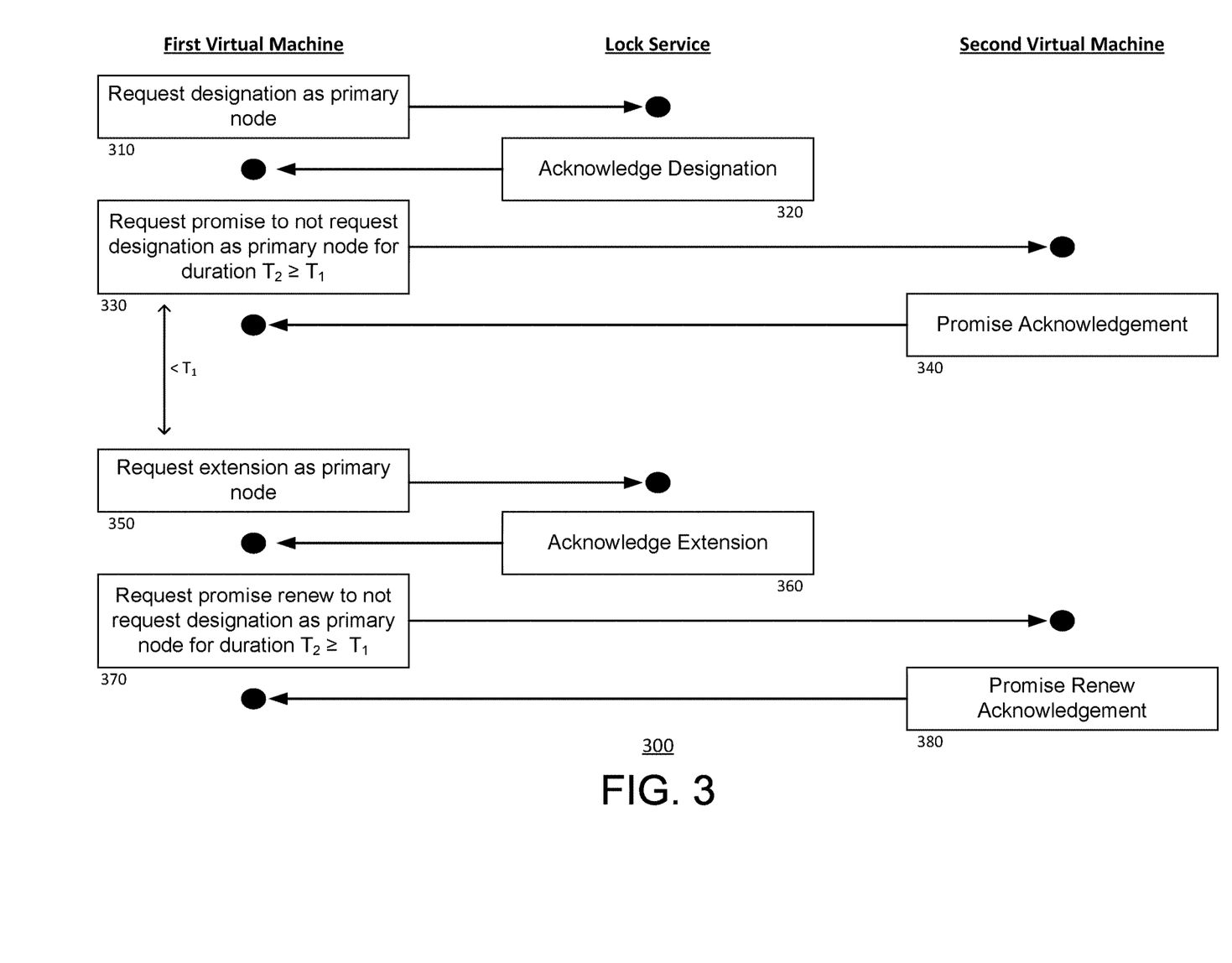
FIGS. 3-7 are block diagrams of example methods implemented using the example database of FIG. 2.
Figure 4:
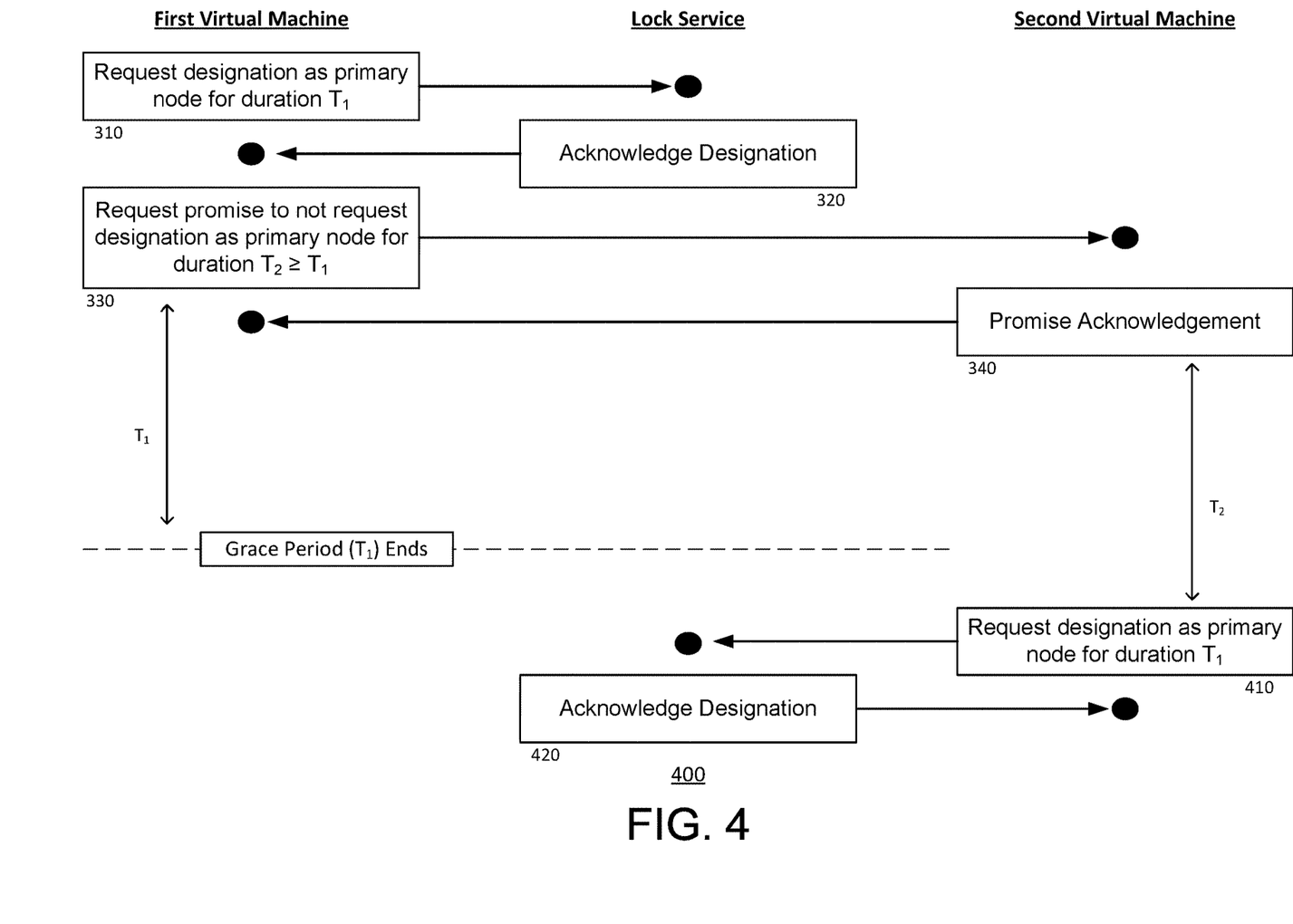
Figure 5:
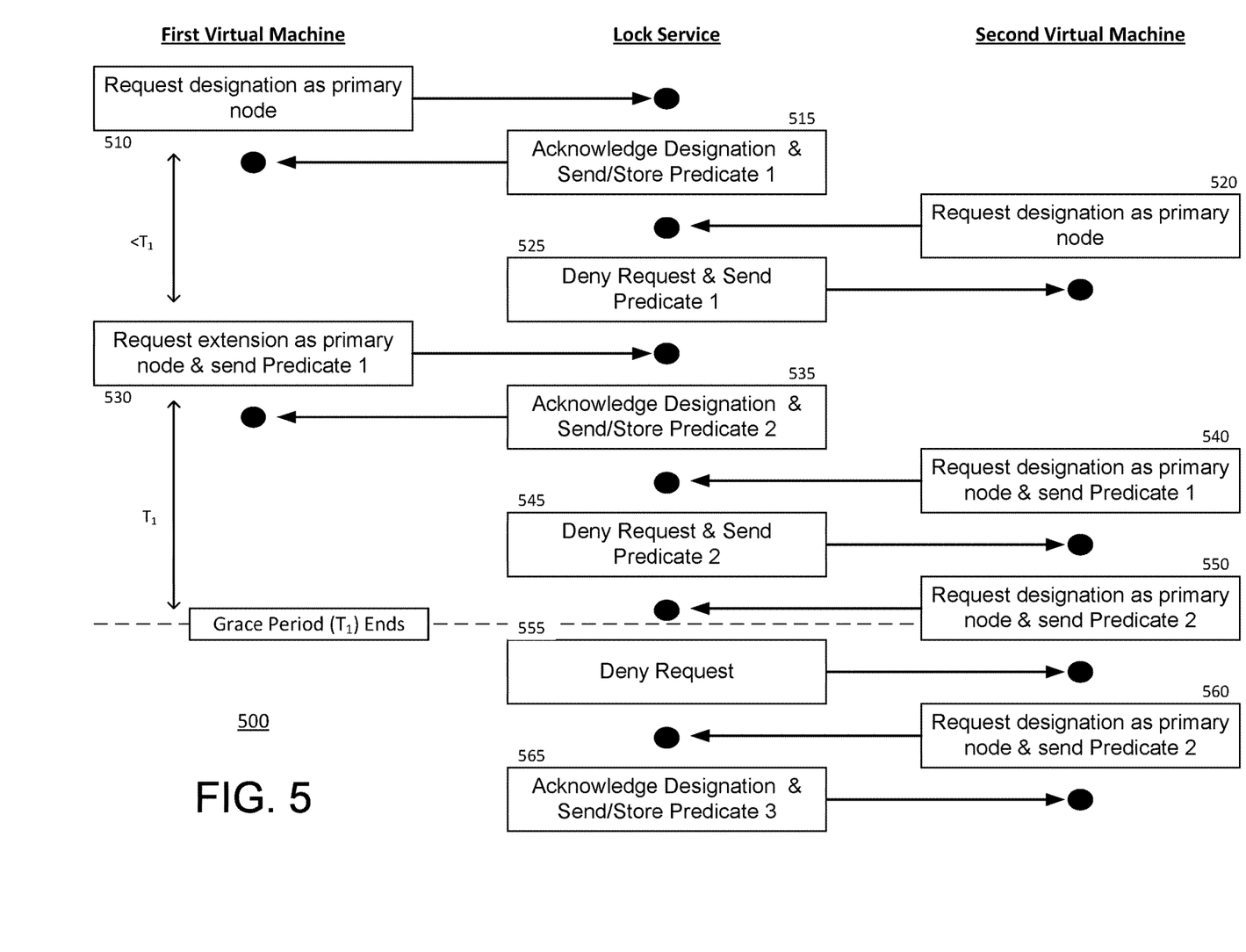

FIGS. 3-5 are diagrams illustrating various routines that may be conducted by the primary and secondary nodes 232, 234 and the lock service node 220 shown in FIG. 2. Each of the "primary node" and "secondary node" labels in FIG. 3 indicate a temporary designated status of respective virtual machines included in datacenter, and this designated status is subject to change under certain conditions are described in the example routines herein.

FIG. 3 illustrates a primary node designation and extension routine 300. In the example of FIG. 3, the routine begins with two virtual machines being designated as potential primary and secondary nodes, but neither one of the two virtual machines having being designated the primary node.

At block 310, a first virtual machine transmits a request to the lock service node to be designated as the primary node.

The lock service node may receive the request and confirm that no other node is currently designated as primary node. At block 320, the lock service node transmits back to the first virtual machine an acknowledgement, acknowledging that the first virtual machine has been designated as the primary node. In some examples, designation of the first virtual machine as primary node may by default designate the second virtual node as a secondary node. In other examples, designation of a secondary node may be prompted by a different activity, such as receiving a designation request from the second virtual machine and denying the request, or such as receiving an instruction from the control plane of the datacenter.

At block 330, the primary node may transmit a request to the second virtual machine, which has been designated as the secondary node, to promise or guarantee that the second virtual machine will honor the primary node designation of the first virtual machine. Honoring the primary node designation may involve the second virtual machine not requesting its own designation as the primary node. At block 340, the second virtual machine transmits back to the first virtual machine an acknowledgement of the promise or guarantee, meaning that the first virtual machine is assured that the second virtual machine will not disrupt its status as the primary node.

In order to avoid long outages, the designation as primary node lasts only a finite amount of time $T_1$, also referred to herein as a grace period, and may be rescinded by the lock service node after expiration of the grace period $T_1$. Likewise, the promise by the second virtual machine can last only a finite amount of time $T_2$, referred to herein as a promise period, so that after or when the grace expires the second virtual machine is available and able to request designation as the primary node. The length of time periods $T_1$ and $T_2$ are chosen in accordance with availability requirements of the database service since these time periods affect, in the case of failure of a primary node, a maximum duration of failover, e.g. until another node is designated as new primary node. The promise period $T_2$ may be equal to or longer than the grace period $T_1$. A relatively short promise period allows for the second virtual machine to quickly request designation as the primary node just after the grace period $T_1$ expires. Conversely, extending the promise period can provide a cushion between an unlocking event receipt of the second virtual machine's designation request at the lock service node. In some examples, the promise period and grace period may be equal to each other but a buffer may be provided by starting each period at a separate time such as block 310 for the grace period and block 330 for the promise period, or block 320 for the grace period and block 340 for the promise period.

In order to avoid a situation in which the first virtual machine loses its designation as the primary node to the second virtual machine, the first virtual machine must repeatedly transmit requests to the lock service node to extend its designation as primary node, and to the second virtual machine in order to extend the promise.

At block 350, the first virtual machine transmits an extension request to the lock service node to extend its designation as primary node. The request is transmitted at a time occurring a predetermined duration after the initial designation as primary node. The duration may be chosen to be shorter than the grace period $T_1$, which is necessarily shorter than the promise period $T_2$. Thus, the designation is renewed before it expires and before the second virtual machine attempts to request re-designation of the primary node status. In some examples, a starting time of the renewal period (shown as "<$T_1$" in FIG. 3) may be measured from block 310. In other examples, the renewal period may be measured starting from block 320. The duration of the renewal period could be measured starting from blocks 330 or 340, but this may lead to a risk of the designation expiring early is communications between the lock service and first virtual machine, or between the first and second virtual machines, is delayed.

At block 360, the lock service node checks that the first virtual machine is the primary node and thus authorized to extend its designation, and then transmits back to the first virtual machine an acknowledgement of the extension of the designation as primary node. Extension of initial designation as primary node may reset the grace period $T_1$, such that the first virtual machine can reset its renewal period with risk of losing its designation as the primary node.

At block 370, the primary node may transmit a request to the second virtual machine to extend the promise by the second virtual machine to honor the primary node designation of the first virtual machine. At block 380, the second virtual machine transmits back to the first virtual machine an acknowledgement of extension of the promise, meaning that the first virtual machine is assured that the second virtual machine will continue to not disrupt its status as the primary node for the duration of the promise period $T_2$.

FIG. 4 illustrates a failover routine 400. The example of FIG. 4 begins with blocks 310-340 of FIG. 3, in which the first virtual machine is designated primary node by the lock service node for a grace period and receives a promise from the second virtual machine to not request designation as primary node until after expiration of a promise period. However, in the example of FIG. 4, the first virtual machine does not request an extension of the designation as primary node. This may be for any one or combination of reasons. For example, the first virtual machine may experience a failure, rendering it unable to update the lock service node or any other node of its inability to act as a primary node. For further example, the first virtual machine may not be dead but may demote itself, such as after passage of a demote time stored at the virtual machine. For further example, the first virtual machine may receive a control message from the workflow manager at the control plane (such as block 170 in FIG. 1) directing the first virtual machine to demote itself.

Since the first virtual machine does not request an extension of the designation as primary node, it also does not renew its request for a promise from the second virtual machine. Therefore, as or shortly after the grace period $T_1$ for the first virtual machine expires, the promise period for the second virtual machine also expires. Since the second virtual machine does not renew its promise to not request designation as the primary node, the second virtual machine is left free to request designation as the primary node.

At block 410, the second virtual machine transmits to the lock service node a request to be designated as the primary node. Since the request is transmitted by the second virtual machine after expiration the promise period, it is necessarily received by the lock service node after expiration of the grace period. As such, when the lock service node receives the request and checks whether the primary node has already been designated to a different virtual machine, it will determine that no such designation is currently in effect. Then, at block 420, the lock service node will return to the secondary node an acknowledgement of the designation request, thereby designating the second virtual machine as the primary node. After block 420, requests from a client to access or process a dataset will be handled by the second virtual machine instead of the first virtual machine, thus completing the failover process.

The example failover process of FIG. 4 is advantageous in that all decisions and operations are carried out within the data plane, thus completely excluding the control plane from the process. This avoids the time and processing costs associated with conducting failover based on node health measurements and workflow management instructions.

The above examples generally show designation, extension and failover routines in a system that supports unique identifications for each virtual machine, such as the use of run_id for identifying servers. This may be possible in some databases such as Redis, but not possible in other databases. Therefore, alternative identification and validation methods may be needed to ensure that a request for designation as a primary node can be granted.

FIG. 5 illustrates an alternative primary node designation, extension and failover routine 500 using predicates. In the example of FIG. 5, the routine begins with two virtual machines being designated as potential primary and secondary nodes, but neither one of the two virtual machines having being designated the primary node.

At block 510, a first virtual machine transmits a request to the lock service node to be designated as the primary node. The lock service node may receive the request and confirm that no other node is currently designated as primary node. At block 515, the lock service node transmits back to the first virtual machine an acknowledgement, acknowledging that the first virtual machine has been designated as the primary node. Along with the acknowledgement, the lock service node can transmit back to the first virtual machine a first predicate (Predicate 1), which may be value needed to validate future requests for designation (or extension of prior designation) as the primary node. The first predicate can be stored in memory of the lock service node for future reference, and may also be stored in the memory of the first virtual machine.

In the example of FIG. 5, the second virtual machine also attempts to be designated as the primary node, potentially creating a conflict. However, the second virtual machine's request is denied. At block 520, the second virtual machine transmits a request to the lock service node to be designated as the primary node. The lock service node may receive the request and check whether any other node is currently designated as primary node. In the example of FIG. 5, the first virtual machine has already been designated as the primary node. Thus, at block 525, the lock service node may return to the second virtual machine a denial of the request. The lock service node may also transmit to the second virtual machine a copy of the first predicate which was provided to the first virtual machine. The first predicate may be used by the second virtual machine to request designation as primary node in future requests, but those requests will not be granted by the lock service node until after expiration of the first virtual machine's designation.

At block 530, the first virtual machine transmits an extension request to the lock service node to extend its designation as primary node. The request is transmitted at a time occurring a predetermined duration after the initial designation as primary node. The duration may be chosen to be shorter than the grace period $T_1$. Thus, the designation is renewed before it expires and before the second virtual machine attempts to request re-designation of the primary node status. The request is also transmitted with the first predicate, which may be recalled from the memory of the first virtual machine. At block 535, the lock service node checks that the first virtual machine is the primary node and thus authorized to extend its designation, and further checks that the first predicate received from the first virtual machine matches the first predicate currently in storage at the lock service node. Upon confirmation of the first virtual machine's status as primary node and the matching first predicates, the lock service may then transmit back to the first virtual machine an acknowledgement of the extension of the designation as primary node. Extension of initial designation as primary node may reset the grace period $T_1$, such that the first virtual machine. The lock service node may transmit back to the first virtual machine a second predicate (Predicate 2) that is different from the first predicate. Transmission of the second predicate may be performed with replacement of the first predicate in the lock service node memory with the second predicate.

Replacement of the first predicate with the second predicate in the lock service node memory may prevent future requests including the first predicate from being granted. In other words, the requests including the first predicate may be determined to be outdated compared to the first virtual machine's request to extend its designation as primary node, and thus may be denied by the lock service node. At block 540, the second virtual machine transmits a request to the lock service node to be designated as the primary node. The second virtual machine may also transmit with the request the first predicate, which is pulled from storage of the second virtual machine. The lock service node may receive the request and first predicate and check whether any other node is currently designated as primary node, and whether the first predicate matches the currently stored predicate, which in this case is the second predicate. In this particular example, either of these checks will cause the request from the second virtual machine to be denied, since the first virtual machine has been re-designated as the primary node, and because the first predicate does not match the second predicate. Thus, at block 545, the lock service node may return to the second virtual machine a denial of the request. The lock service node may also transmit to the second virtual machine a copy of the second predicate which was provided to the first virtual machine, and the second virtual machine may replace the first predicate stored in its memory with the second predicate for future requests.

In the example of FIG. 5, the second virtual machine may send additional requests to the lock service node. The additional requests ensure that if the first virtual machine were to fail, then the second virtual machine may be designated as the primary node without having to wait for the control plane of the system to intercede. However, requests from the second virtual machine may be denied until a request is received at the lock service node after expiration of the grace period for the first virtual machine. To illustrate, at block 550, the second virtual machine may transmit another request for designation as primary node along with the second predicate which is currently in storage at the second virtual machine. However, since the request is received at the lock service node before expiration of the grace period, the request is denied. The request may be denied even if the lock service node transmits the request denial after expiration of the grace period without receiving a request for extension from the first virtual machine. Then, at block 560, the second virtual machine transmits a further request for designation as primary node along with the second predicate. Since this further request is received at the lock service node after expiration of the grace period, and since the second predicate received with the request matches the second predicate in storage at the lock service node, the request may be granted by the lock service node. At block 565, the lock service node transmits an acknowledgement of the second virtual machine being designated the primary node along with an updated third predicate (Predicate 3). This ensures that future requests from the first virtual machine are denied due to the designation of the second virtual machine as primary node, due to the change of the predicate in storage at the lock service node, or a combination thereof.

The example routine 500 of FIG. 5 omits promises between first and second virtual machines. However, in other examples, it may be feasible to supplement the predicate-based validation routine with promise requests and acknowledgements to provide an additional layer of insurance against a secondary node requesting designation as a primary node.

The above examples generally show designation, extension and failover of primary node designation with a working lock service and up to one failed database instance. However, these routines are also flexible in that they can be designed to accommodate situations in which the lock service dies, or even situations in which the lock service and one or more database instance nodes dies.

For instance, in the event of failure of a lock service node, the primary node extension routine can continue on its own without a working lock service node. This can be accomplished by omitting block 360 from the routine of FIG. 3, whereby the promise request transmitted by the primary node at block 370 and the acknowledgement transmitted by the secondary node back to the primary node at block 380 are sufficient to avoid the secondary node attempting to take over as the primary node, even without a lock service to prevent the secondary node from doing so. In one implementation, the primary node may continue to transmit extension requests to the lock service node at block 350, but if no response is received within a timeout period, operations may automatically continue at block 370 with transmission of the promise request. The timeout period may be chosen to be short enough so that the promise request is transmitted by the primary node and received by the secondary node before expiration of the promise period. In a different implementation, after timeout of an extension request transmitted to the lock service node, the primary node may cease transmitting extension requests, thus omitting both blocks 350 and 360 from future designation extensions of the primary node. In other implementations, blocks 350 and 370 may operate exclusive of one another, for instance being transmitted simultaneously. Thus, failure by the lock service to respond to a designation extension request may have no impact on the primary node transmitting a promise extension request to the secondary node. Although handling extension of the primary node designation through promise requests and acknowledgements does not allow for failover to occur, for instance in the case of failure at the primary node, it can at least avoid immediate failure due to the lock service outage. This in turn can give the control plane enough time to recover the lock service node or take over designation of the primary and secondary nodes if the lock service node cannot be quickly repaired.

Figure 6:
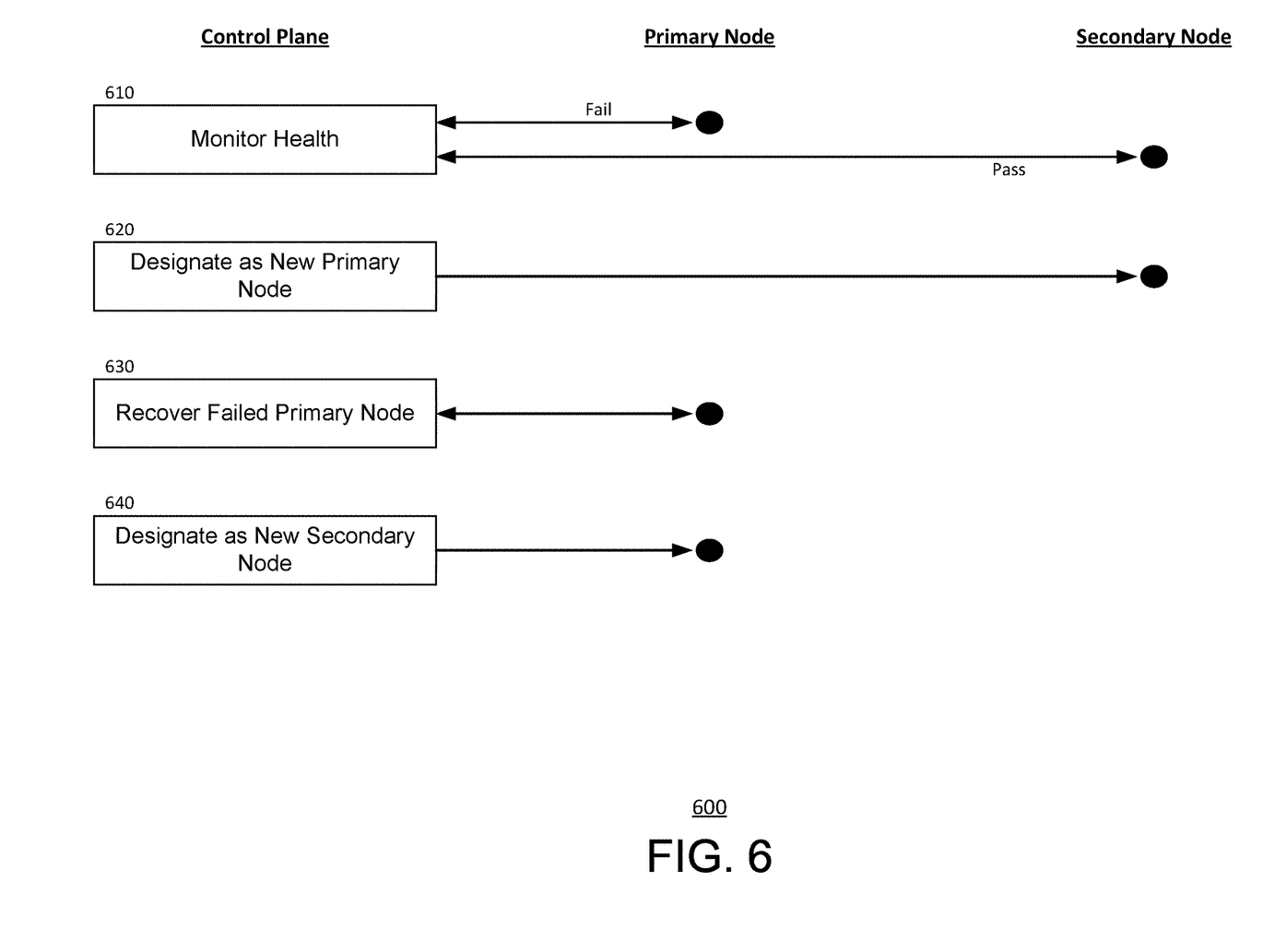

For further instance, in the event of failure at both the lock service and primary node, the above described routines are still flexible enough to accommodate the control plane taking over designation of primary and secondary nodes. FIG. 6 shows an example primary node recovery routine 600 for execution by the one or more processors of the control plane.

At block 610, the health monitor of the control plane may check a health of each of the primary node and the secondary node. In the example of FIG. 6, it is assumed that the primary node fails the health check and that the secondary node passes. Normally, at this stage, the secondary node would have requested designation as the primary node from the lock service node and the lock service node would have re-designated the secondary node as the primary node. But because the lock service node has also been determined to be dead, the failover has not occurred.

At block 620, the workflow manager of the control plane designates the secondary node as the new primary node. The designation may involve receiving confirmation from the node regarding the designation. At block 630, the workflow manager may attempt to recover the previously designated primary node. Recovery may involve any one or combination of recreating the node, restarting the node, or repairing the node. Upon recovery, at block 640, the workflow manager at the control plane can transmit instructions to the previously designated primary node. The instructions may indicate the node's updated status as a secondary node. In some examples, the instructions may indicate the previously designated secondary node's updated status as a primary node. Upon completion of the routine 600, the database may again include a primary node and a secondary node, and without risk of a double-nanny situation in which two primary nodes are designated.

A similar routine may be executed in the secondary node is determined to have failed while the primary node remains operational, whereby the control plane may recover the secondary node and then notify the secondary node of its continued status as secondary node after the recovery.

Figure 7:
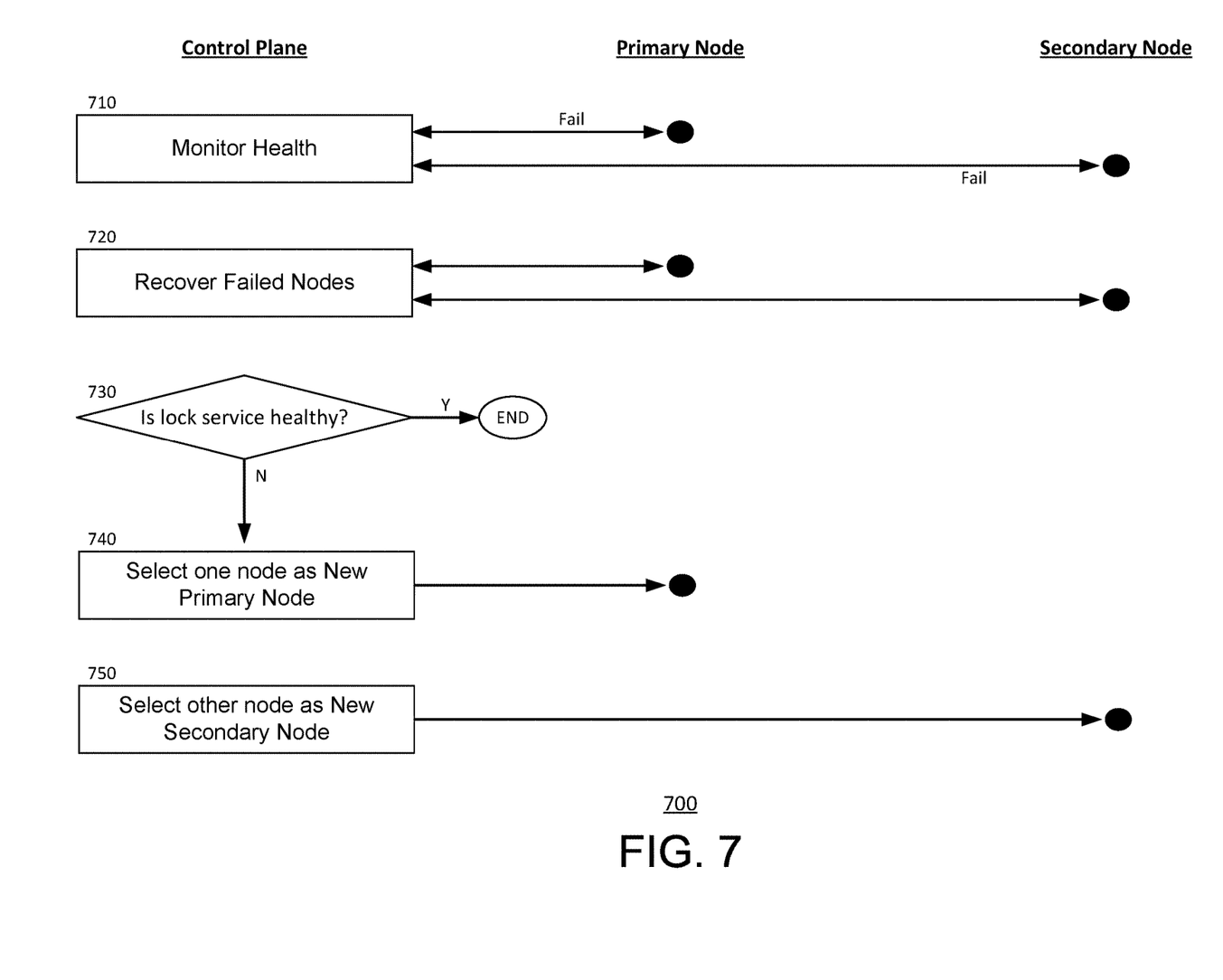

Additionally, in the event of failure at the primary node and secondary node, the above described routines are yet still flexible enough to accommodate the control plane taking over designation of primary and secondary nodes. FIG. 7 shows an example total database recovery routine 700 for execution by the one or more processors of the control plane.

At block 710, the health monitor of the control plane may check a health of each of the primary node and the secondary node. In the example of FIG. 7, it is assumed that both the primary node and the secondary node fail the health check. Since there is no healthy node, even if the lock service node were still healthy, there would be no available node with which to perform a failover operation. As such, whether the lock service node is operational or not, the control plane will need to step in so that database instance nodes may be recovered.

At block 720, the workflow manager of the control plane may attempt to recover each of the previously designated primary node and the previously designated secondary node. As with the example of FIG. 6, recovery may involve any one or combination of recreating the node, restarting the node, or repairing the node.

Further operations may differ depending on whether the lock service node is healthy or dead. To illustrate the difference, a decision block 730 is provided in FIG. 7. The decision at block 730 is a health check that may be performed by the health monitor of the control plane, and that may be performed at an earlier time in the routine, or at a time after completion of block 720. If it is determined by the health monitor that the lock service is healthy, then operations of the routine 700 may end, whereby designation of primary and secondary nodes may be performed by the lock service node as shown in prior examples such as the routine of FIG. 3. However, if the lock service node is not healthy and cannot complete a node designation routine, then operations may continue at block 740 with the workflow manager of the control plane taking over node designation responsibilities from the lock service unit. At block 740, the workflow manager at the control plane may select one of the nodes as a new primary node. The selected node may be either one of the previously designated primary node or the previously designated secondary node. The designation may be confirmed or otherwise acknowledged by the designated node through communication with the control plane. Then, at block 750, the workflow manager may designate the other one of the previous nodes as the secondary node.

Implementation of the designation and failover routines of the present disclosure can reduce database unavailability time. When a database is unavailable until nodes are repaired or replaced by the control plane processors, the outage may last for several minutes. By comparison, failover handled entirely within the data plane may be resolved in much less time, such as two minutes or even one minute. Additionally, the average recovery time may be dictated by respective predetermined durations of the grace period and the promise period, and thus can easily be scaled to meet future needs, such as faster average failover times with more frequent communication to the lock service node, or less frequent communication between data plane nodes with the tradeoff of slower average failover times.

The present disclosure is also beneficial for overcoming a single zone failure such as zone isolation. In the case of the zone isolation, all instances whose primary nodes are in the isolated zone may be subject to failover using the lock service node, thus streamlining the process of creating new primary nodes for all of the temporarily failed instances. Unresponsive nodes can be recovered while the instances continue to run from the secondary nodes (which have been promoted to primary node status). By contrast, reliance on a control plane to handle zone isolation may require wait times of over half an hour, during which the control plane attempts to recreate unresponsive nodes, send control messages to new replica nodes, and finally assign primary node status to the newly created primary node before finally resolving the outage.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
one or more processors; and
memory, wherein the memory and one or more processors are allocated to addresses of a data plane comprising a plurality of virtual machines including a first virtual machine designated as a primary node and a second virtual machine designated as a secondary node, and a lock service configured to control changes in designation of the primary node and the secondary node,
wherein the first virtual machine is configured to repeatedly issue a request to at least one of the second virtual machine or the lock service extending designation of the first virtual machine as the primary node for a first duration of time, wherein the request is repeatedly issued within a second duration of time shorter than the first duration of time, and
wherein the second virtual machine is configured to:
receive from the first virtual machine or the lock service an indication of the designation of the first virtual machine as the primary node being extended for the first duration of time;
after passage the first duration of time without a further indication of the designation of the first virtual machine as the primary node being extended, issue a request to the lock service to change the designation of the primary node from the first virtual machine to the second virtual machine; and
receive confirmation from the lock service of the change in designation of the primary node from the first virtual machine to the second virtual machine.

2. The system of claim 1, wherein the first virtual machine is configured to repeatedly issue the request until occurrence of a failure at the first virtual machine, a determination at the first virtual machine to self-demote from the designation as the primary node, or receiving, from one or more servers of a control plane communicatively coupled to the data plane, an instruction to demote itself from the designation as the primary node.

3. The system of claim 1, wherein each of the first virtual machine and the second virtual machine is assigned a unique identification, and wherein the lock service is configured to track designation of the primary node and the secondary node based on the respective unique identifications of the first virtual machine and the second virtual machine.

4. The system of claim 3, wherein the unique identification of the first virtual machine is reset each time a process of the first virtual machine is restarted, and wherein the unique identification of the second virtual machine is reset each time a process of the second virtual machine is restarted.

5. The system of claim 3, wherein the respective unique identifications of the first virtual machine and the second virtual machine are stored in memory, such that the respective unique identifications do not change each time a respective process of the first virtual machine or the second virtual machine is restarted.

6. The system of claim 1, wherein the first virtual machine is further configured to receive from the lock service, in response to the request extending designation of the first virtual machine as the primary node, confirmation of the designation of the first virtual machine as the primary node.

7. The system of claim 6, wherein the lock service is configured to:
- store in memory a stored precondition;
- receive a conditional request from a requesting virtual machine to maintain or change the designation of the primary node, wherein the conditional request includes a precondition from the requesting virtual machine;
- compare the precondition from the requesting virtual machine to the stored precondition;
- responsive to the precondition from the requesting virtual machine matching the stored precondition, authorize the conditional request; and
- responsive to the precondition from the requesting virtual machine not matching the stored precondition, deny the conditional request.

8. The system of claim 7, wherein the lock service is further configured to:
- transmit to each of the first virtual machine and the second virtual machine, in response to the request extending designation of the first virtual machine as the primary node, a first precondition for maintaining or changing the designation of the primary node; and
- store the first precondition in the memory.

9. The system of claim 8, wherein the lock service is further configured to:
- receive a first conditional request from one of the first virtual machine or the second virtual machine, the first conditional request including the first precondition;
- authorize the first conditional request;
- transmit, to each of the first virtual machine and the second virtual machine, an indication of the authorized first conditional request and a second precondition; and
- replace the stored first precondition with the second precondition in the memory,
- wherein the first conditional request being received from the first virtual machine results in extending designation of the first virtual machine as the primary node for the first duration of time, and wherein the first conditional request being received from the second virtual machine results in changing designation of the primary node from the first virtual machine to the second virtual machine.

10. The system of claim 1, further comprising a control plane comprising one or more processors for managing operation of the plurality of virtual machines in the data plane, wherein the one or more processors of the control plane are configured to:
- monitor health of each of the first virtual machine, the second virtual machine and the lock service;
- in response to an indication of failure of one of the first virtual machine or the second virtual machine, execute one or more programs to recover the failed virtual machine;
- after recovery of the failed virtual machine, transmit an indication to the recovered virtual machine designating the other virtual machine as the primary node; and
- after transmission of the indication to the recovered virtual machine, transmitting an instruction to the other virtual machine designating it as the primary node.

11. The system of claim 10, wherein the one or more processors of the control plane are configured to, in response to determining that the lock service and the primary node are inoperable:
- transmit instructions to the secondary node designating it as the primary node;
- recover, repair, restart or replace the primary node; and
- transmit instructions to the recovered, repaired, restarted or replaced primary node designating it as the secondary node.

12. The system of claim 11, wherein the one or more processors of the control plane are configured to, in response to determining that the lock service and both the primary and secondary nodes are inoperable:
- recover, repair, restart or replace each of the primary node and the secondary node;
- select one of the nodes to be the primary node;
- transmit instructions to the selected recovered, repaired, restarted or replaced node designating it as the primary node; and
- transmit instructions to the not-selected recovered, repaired, restarted or replaced node designating it as the secondary node.

13. The system of claim 12, wherein the one or more processors of the control plane are configured to, in response to determining that both the primary and secondary nodes are inoperable and that the lock service is operable, recover, repair, restart or replace each of the primary node and the secondary node,
- wherein each of the recovered, repaired, restarted or replaced nodes is configured to transmit to the lock service a request for designation as the primary node, and
- wherein the lock service is configured to grant the request for designation to a first requesting node.

14. A method of controlling designation of a primary node and a secondary node among a plurality of virtual machines in a data plane of a data center, the method comprising:
- receiving, at one or more processors, an indication of designation of a first virtual machine as the primary node, wherein the one or more processors are assigned to a second virtual machine;
- transmitting, from the one or more processors to the first virtual machine, an acknowledgement of the indication of designation;
- receiving, at the one or more processors, an indication of extension of the designation of the first virtual machine as the primary node, wherein the indication of extension is received a predetermined first amount of time after the indication of designation is received;
- determining passage of a predetermined second amount of time after the indication of extension is received without receiving a further indication of extension, wherein the second amount of time is greater than the first amount of time;
- in response to the determination, transmitting, from the one or more processors to a lock service, a request for designation as the primary node; and
- receiving, from the lock service at the one or more processors, confirmation that the second virtual machine is designated as the primary node.

15. The method of claim 14, wherein the second virtual machine is initially designated as the secondary node, wherein the request for designation as the primary node is a request to change the designation of the second virtual machine from the secondary node to the primary node.

16. The method of claim 14, wherein each virtual machine is associated with a unique identification separate from an IP address of the virtual machine, and wherein transmitting the request for designation as the primary node comprises transmitting the unique identification of the second virtual machine to the lock service.

17. The method of claim 14, further comprising:
receiving the indication of designation of the first virtual machine as the primary node with a first precondition for changing the designation of the primary node from the first virtual machine to the second virtual machine; and
storing the first precondition in memory.

18. The method of claim 17, further comprising:
receiving, by the one or more processors, the indication of extension with a second precondition, wherein the second precondition is different from the first precondition;
replacing, by the one or more processors, the stored first precondition with the second precondition in the memory; and
transmitting, by the one or more processors to the lock service, the request for designation as the primary node with the second precondition.

19. A method of controlling designation of a primary node and a secondary node among a plurality of virtual machines in a data plane of a data center, the method comprising:
receiving, at one or more processors included in the data plane of the data center and configured to execute a lock service routine, a designation request from a first virtual machine to be designated as the primary node;
transmitting, from the one or more processors to the first virtual machine, confirmation that the first virtual machine is designated as the primary node for a grace period having a predetermined length and beginning from receipt of the designation request;
receiving, at the one or more processors, an extension request from the first virtual machine to renew the designation of the first virtual machine as the primary node, wherein a time between the designation request and the extension request is a lease period shorter than the grace period;
transmitting, from the one or more processors to the first virtual machine, confirmation that the first virtual machine is maintained as the primary node;
resetting, by the one or more processors, the grace period to begin from receipt of the extension request;
receiving, at the one or more processors from a second virtual machine, a first change request to change designation of the primary node to the second virtual machine, wherein the first change request is received during the grace period;
transmitting, from the one or more processors to the second virtual machine, denial of the first change request;
receiving, at the one or more processors from the second virtual machine, a second change request to change designation of the primary node to the second virtual machine, wherein the second change request is received after expiration of the grace period; and
transmitting, from the one or more processors to the second virtual machine, acceptance of the second change request.

20. The method of claim 19, further comprising:
receiving, at the one or more processors, a unique identification of the first virtual machine with the designation request, wherein the unique identification is separate from an IP address of the first virtual machine;
storing, the one or more processors, the unique identification of the first virtual machine in memory;
receiving, at the one or more processors, the unique identification of the first virtual machine with the extension request;
determining that the extension request is received from the first virtual machine based on the unique identification; and
transmitting, from the one or more processors to the first virtual machine, the confirmation in response to the determination that the extension request is received from the first virtual machine.

21. The method of claim 19, further comprising:
transmitting, by the one or more processors, a first precondition to the first virtual machine with the confirmation that the first virtual machine is designated as the primary node;
storing, by the one or more processors, the first precondition in memory;
receiving, at the one or more processors, the first precondition from the first virtual machine with the extension request;
determining that the extension request is valid based on the first precondition received with the extension request matching the first precondition stored in memory;
transmitting, by the one or more processors, a second precondition to the first virtual machine with the confirmation that the first virtual machine is maintained as the primary node; and
replacing, by the one or more processors, the stored first precondition with the second precondition in the memory.

22. The method of claim 21, wherein transmitting the first precondition to the first virtual machine further comprises transmitting the first precondition to the second virtual machine, transmitting the second precondition to the first virtual machine further comprises transmitting the second precondition to the second virtual machine, receiving the first change request from the second virtual machine further comprises receiving the second precondition from the second virtual machine, and receiving the second change request from the second virtual machine further comprises receiving the second precondition from the second virtual machine, wherein the method further comprises:
determining, by the one or more processors, to grant the second change request based on each of (i) the expiration of the grace period and (ii) the second precondition received with the second change request matching the second precondition stored in memory.

* * * * *